United States Patent [19]
Guillory

[11] 3,732,674
[45] May 15, 1973

[54] ARTICLE SHREDDING MACHINE
[76] Inventor: Calvin J. Guillory, 109 Avant St., West Monroe, La. 71291
[22] Filed: Apr. 14, 1972
[21] Appl. No.: 244,112

[52] U.S. Cl. .............................. 56/13.1, 56/DIG. 8
[51] Int. Cl. ............................................. A01d 73/00
[58] Field of Search .................. 56/13.1, 501, DIG. 8

[56] References Cited
UNITED STATES PATENTS

| 2,105,803 | 1/1938 | Barnes | 56/501 |
| 2,538,643 | 1/1951 | Gregory | 56/13.1 |
| 2,590,734 | 3/1952 | Strong | 56/501 |

Primary Examiner—Antonio F. Guida
Attorney—Norvall E. Von Bekren

[57] ABSTRACT

An article shredding machine having new and novel means for guiding the articles to be shredded into the machine with means provided to pre-shred the articles prior to their introduction into the shredding mechanism. The improved shredding mechanism comprises a plurality of generally rectangular shaped blades rotating in juxtaposition to a plurality of generally rectangular shaped fixed blades. Also provided on the machine is a blower downstream of the shredding mechanism to blow the finely shredded particles away from the machine.

7 Claims, 7 Drawing Figures

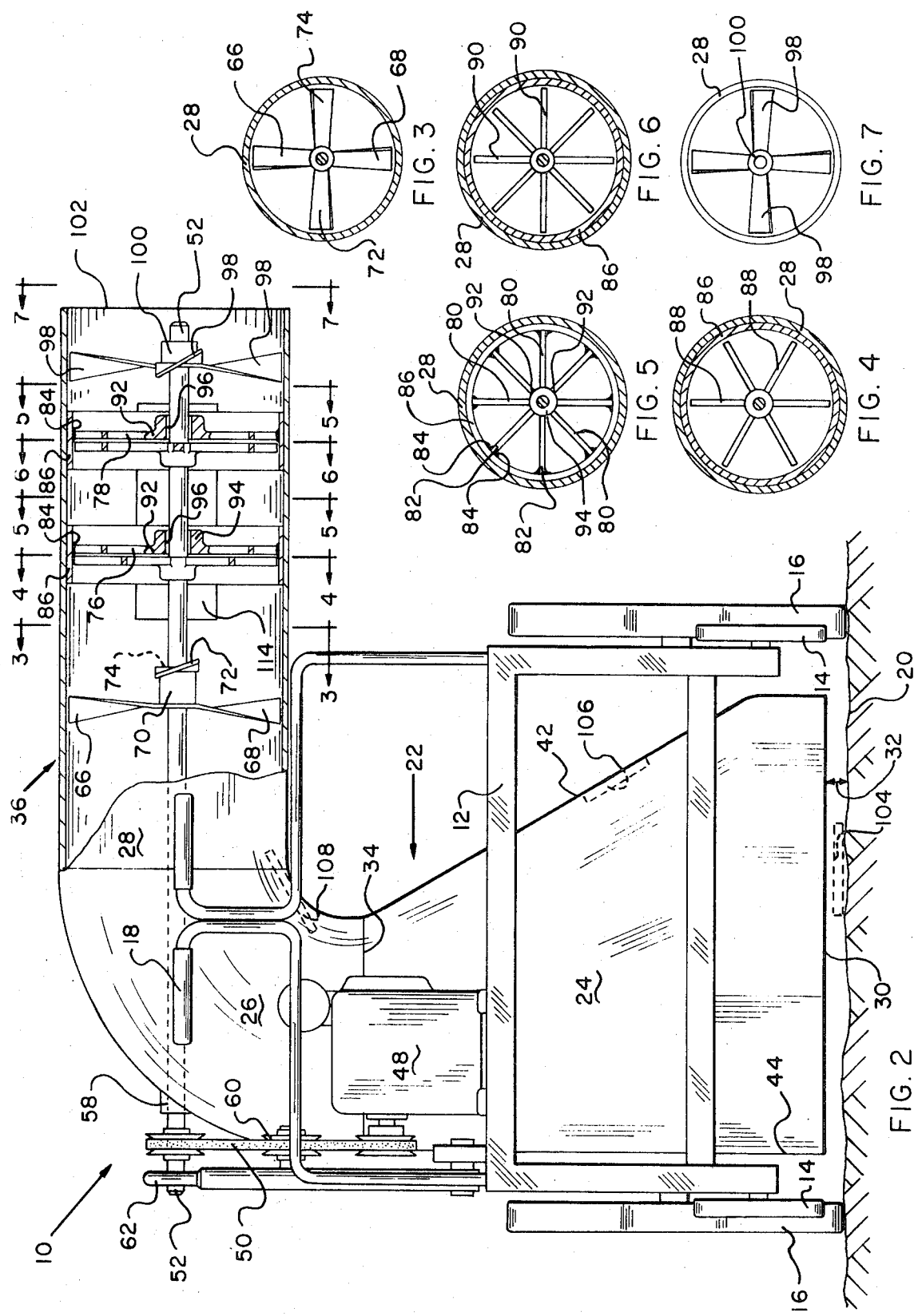

ARTICLE SHREDDING MACHINE

BACKGROUND OF THE INVENTION

This invention relates in general to article shredding machines and in particular to a new and improved shredding machine and method which may be used for cleaning a yard of accumulated debris and leaves with the debris and leaves being finely shredded and returned to the lawn as fertilizer.

The problem of ridding an area of accumulated debris such as leaves, small twigs and branches is well known to one owning property having trees planted thereon. One universal method of getting rid of this debris has been to spend long hours manually raking the leaves into piles and then burning the individual piles or transporting the debris away in bags or bushel baskets.

With the advent of pollution controls, many municipalities have passed ordinances which outlaw the former method of burning the debris leaving the property owner with the back-breaking task of resorting to the latter method. This method has not been completely overlooked in the past, however, and man, with his mechanized mind, has attempted many ways to ease the burden of ridding the lawn of this accumulated debris.

Past approaches to this perplexing problem appear to have been centered on three types of machines which will now be described and referred to generally as sweepers, hopper-fed grinders and recycling article shredders. The first approach using sweepers is typified by the patent issued on Jan. 8, 1935 to M.S. Rudd, U.S. Pat. No. 1,987,371; the patent issued on Dec. 8, 1953 to J.F. Joy, U.S. Pat. No. 2,661,493 and the patent issued May 25, 1965 to W.E. Norden, U.S. Pat. No. 3,184,777. All of these patents taught generally the use of rotating brushes or fingers to pick up or sweep the debris into a trailing bag or collector bin from which it is later removed and discarded. This approach, while satisfactory from the point of view of ridding the lawn of the debris, did not solve the problem of getting rid of the debris after it was swept into the machine.

The second type of approach, using hopper-fed grinders, is illustrated in the patent issued to A. Bjorklund, U.S. Pat. No. 2,528,942 on Nov. 7, 1950; the patent issued to B.E. De Lamater, Sr., U.S. Pat. No. 2,584,262 on Feb. 5, 1952; the patent issued to J.M. Williams et al., U.S. Pat. No. 2,647,694 on Aug. 4, 1953; the patent issued to H.G. Ward, U.S. Pat. No. 2,822,846 on Feb. 11, 1958; the patent issued to J.S. Ostrowski, U.S. Pat. No. 2,825,377 on Mar. 4, 1958; the patent issued to R.S. Peltier, U.S. Pat. No. 3,002,702 on Oct. 3, 1961; the patent issued to Robert D. Lautzenhieser, U.S. Pat. No. 3,240,247 on Mar. 15, 1966, and the patent issued to H.F. Johnson, U.S. Pat. No. 3,412,770 on Nov. 26, 1968. All of these patents teach the use of hopper feeders into various types of grinding mechanisms to grind the debris to the desired size. This method, while solving the problem of reducing the debris to a size that was easily disposed of, did not solve the problem of getting the debris to the grinder and ultimately disposing of the debris after it had been ground to the desired size.

The last approach to the problem, and the one which concerns the subject invention, is best illustrated in the patent issued to M.S. Barnes, U.S. Pat. No. 2,105,803 on Jan. 18, 1938; the patent issued to J.A. Ronning, U.S. Pat. No. 2,661,584 on Dec. 8, 1953 and the patent issued to J.D. Shaw, U.S. Pat. No. 3,049,857 on Aug. 21, 1962. All of these prior art devices teach the use of a combination of the sweeper and shredder approach but are not adaptable to total cleaning of the accumulated area as will be more fully explained and will become apparent after reading the hereinafter description of the preferred embodiment.

SUMMARY OF THE INVENTION

In order to overcome all of the problems inherent in the prior art devices, there is provided, by the subject invention, a new and novel article shredder, of the before mentioned third type, having new and improved features heretofore unavailable on the prior art devices. These features allow the machine to pick up and shred virtually any size and shape of debris falling within the size limitations of the particular machine. This is accomplished by using a new and novel concept of providing a power package, consisting of a vacuum inducer/pre-shredder stage, a shredding stage and a final blowing stage, all of said stages being used in combination with a new and improved guiding means for aligning the accumulated debris, and feeding it with a smooth entry into the power package.

Accordingly it is an object of the invention to provide a new and novel article shredding machine having improved pickup capabilities and having novel guiding means to prevent jamming up of the debris within the machine.

Another object of the invention is to provide a new and novel article shredding machine that can be used on all sizes and types of debris including sticks, stones, twigs, branches and leaves or the like.

Still another object of the invention is to provide a new and novel article shredding machine that has a novel pre-shredding stage which breaks up the debris prior to its entry into the shredding stage or stages.

Yet another object of the invention is to provide a new and novel shredding mechanism having a novel safety ring surrounding the mechanism.

These and other objects and advantages will become apparent from a study of the drawings and from a reading of the description of the preferred embodiment.

BRIEF DESCRIPTION OF THE DRAWINGS

FIG. 2 is an end view, with the power package shown partially in section and showing the new and novel guiding means for guiding the debris into the power package;

FIG. 3 is a sectional view, taken along line 3—3 of FIG. 2, showing the vacuum inducer/pre-shredder stage of the subject invention;

FIG. 4 is a sectional view, taken along line 4—4 of FIG. 2, showing the rotating blades of the first stage shredder of the invention;

FIG. 5 is a sectional view taken along line 5—5 of FIG. 2, showing the rotating blades of the second stage shredder of the invention;

FIG. 6 is a sectional view, taken along line 6—6 of FIG. 2, showing the rotating blades of the second stage shredder of the invention; and FIG. 7 is an end view, taken along line 7—7 of FIG. 2, showing the rotating blades of the blower stage of the invention.

DESCRIPTION OF THE PREFERRED EMBODIMENT

Figure 1:
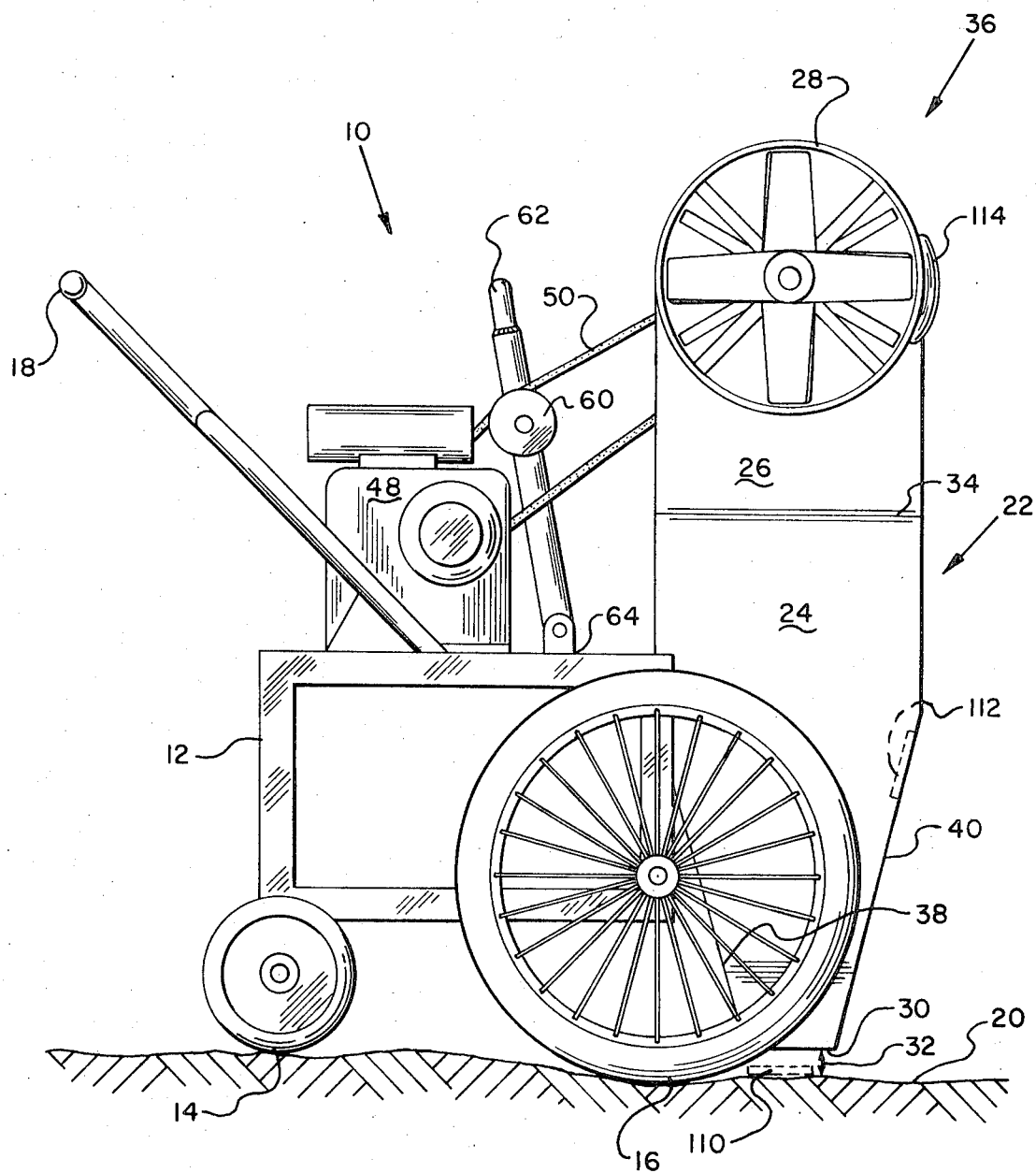
FIG. 1 is a side view of the subject invention shown looking into the discharge end of the machine.

Referring now to the drawings in general and in particular to FIGS. 1 and 2 of the drawings there is shown the new and improved article shredding machine of the subject invention generally by the numeral 10 which comprises a frame 12 having rotatably mounted thereon a plurality of wheels 14 and 16 by means well known in the art. The frame 12 has pivotably mounted thereon a handle 18 for propelling the frame over the lawn 20 of the user of the device.

Fixedly mounted on the frame 12 is a guiding means, shown generally by the numeral 22 which comprises essentially an inlet section 24, a transformation section 26 and an outlet section 28. The inlet section 24 comprises a generally rectangular shaped inlet 30 which is positioned a pre-determined distance 32 from the lawn 20 depending on the size of the debris desired to be picked up by the machine. From experimentation it has been found to be advantageous to have the distance 32 range approximately one-half to 1 inch whenever the inlet section is substantially rectangular in shape and has an inlet area at the inlet 30 of approximately 84 in.$^2$.

Fixedly attached to the guiding means 22 at the edge 34 is the transformation section 26 which functions to transform the generally rectangular inlet section 24 into a generally circular outlet section 28 which also serves to align and guide the larger pieces of debris, such as twigs and branches into the power package of the unit, shown generally by the numeral 36. The inlet section 24 also serves this function with its inclined sides 38, 40 and 42. The fourth side 44 of the inlet section 24 is shown generally as vertical but it is within the spirit and scope of the invention that it could also be inclined. While the inlet section 24 is shown generally rectangular, it is conceivable that is also could be of some other shape such as oval or circular, etc. as long as the ultimate shape functions to guide the twigs and branches into the machine as will be more fully described hereinafter.

Formed on the edge 46 of the transformation section 26 is the outlet section 28 which is generally circular in configuration to accommodate the power package 36 mounted within the outlet section. Mounted on the frame 12 is a motor 48, which may be electric or gasoline powered and which serves to drive the power package 36 by means of the belt 50 and the drive shaft 52. The drive shaft 52 is carried by a bearing 58 which is rigidly attached to the transformation section 26. The power to the power package 36 may be rapidly engaged or disengaged by means of the pulley 60 rotatably mounted on the pivotable hand lever 62 which is in turn mounted on the frame 12 at the edge 64 by means well known in the art.

Referring now generally to FIGS. 2 and 3 and to the power package 36 there is provided in the embodiment shown a means for inducing a vacuum at the inlet 30 which comprises at least 2 fan blades 66 and 68 which are fixedly mounted on the drive shaft 52 by means of the hub 70 as is well known in the art. The fan blades 66 and 68 are pitched a sufficient amount, depending upon the desired vacuum at the inlet 30 in order to induce a vacuum in the inlet section 24 sufficient to draw the accumulated leaves, twigs, branches and other debris into the machine where it will be carried through the shredder. Formed on the hub 70 at a position downstream of the blades 66 and 68 are a plurality of pre-shredder blades 72 and 74 which act, in combination, with the blades 66 and 68 to pre-shred and also to induce the necessary vacuum at the inlet 30. The pre-shredder blades 72 and 74 may also be pitched a sufficient amount, depending upon the desired amount of vacuum and are positioned at 90° angles to the blades 66 and 68 and 2 inches behind them in the embodiment shown.

Formed within the outlet section 28 downstream from the preshredder blades 72 and 74 are at least two groups of fixed shredder blades 76 and 78 comprising a plurality of generally rectangular shaped fixed blades 80. The first group 76 of fixed shredder blades 80 will be referred to hereinafter as the primary shredder blades and the second group 78 of fixed shredder blades 80 will be referred to as the secondary shredder blades. The outer edge 82 of the fixed blades 80 are welded at 84 to a safety ring 86 which surrounds the fixed blades 80 as well as the rotating shredder blades 88 and 90 which will be described more fully hereinafter. The inner edge 92 of the fixed blades 80 is formed on the hub 94 which also carries a bearing 96 to journal the shaft 52 within the outlet section 28.

Formed on the drive shaft 52 in close juxtaposition to the fixed blades 80 are the first stage rotating shredder blades 88 and the second stage rotating shredder blades 90 which, combined with the fixed blades 80, form the two stage shredder of the subject invention. In the embodiment shown the number of fixed blades 80 is shown as eight per stage and the number of rotating shredder blades are shown as six in the first stage (FIG. 4) and eight in the second stage (FIG. 6). However it is within the spirit and scope of the invention that the number of blades, as well as the number of stages, could be varied depending upon the size and type of debris to be picked up and shredded by the machine. In the embodiment shown, it is preferable to have the safety ring 86 surrounding at least the fixed and rotating shredder blades 80, 88 and 90 since the cutting action of these blades on the harder debris may tend to cause stresses to be formed which could damage the blades or a portion of them. It may also be desirable to have a safety ring surrounding the rotating preshredder blades 66, 68, 72 and 74 but it is not felt that this is necessary since the stress level in these blades should be lower due to the absence of the cutting effect achieved by the stationary blades.

Referring now to FIG. 7 of the drawing there is shown the means for blowing the shredded objects out of the outlet section 28 and away from the machine 10. This is accomplished by a plurality of pitched blades 98 formed on a hub 100 which is fixed to the drive shaft 52 by means well known in the art. The blades 98 may number more or less than the four shown in the embodiment without departing from the spirit and scope of the invention. In addition the blades 98 may be surrounded with a safety ring 86 for the maximum degree of protection. When it is desired to collect the shredded debris, a bag (not shown) may be attached to the outlet 102 by means well known in the art, however it is preferable that the debris be returned to the lawn where it can be used to fertilize the grass.

From experimentation it has been found that with a 4 ½ horsepower, four cycle gasoline driven motor 48, operating to rotate the power package 36 at 2500

RPM, the machine will operate satisfactorily to pick up the usual type of debris found on residential lawns whenever the diameter of the outlet section is approximately 12 inches. However it is within the spirit and scope of the invention that the various parameters could be varied to pick up even larger debris if the machine should be used over surfaces other than a residential lawn. For example it is foreseen that a modified form of the machine could be mounted on the front or rear of a truck and the unit used to sweep streets and driveways with the shredder blades being strengthened in order to be able to grind the stones and bigger debris usually found on a street but not found as often in a residential lawn.

By using the inclined sides 38, 40, 42 and by possibly inclining the fourth side 44 of the inlet section it is thought that the smaller twigs and branches are turned for a head-on entry into the shredder. For example, referring to FIG. 2 if the branch is lying in the position illustrated by the dashed lines 104, the inclined sides will tend to turn it to the position shown by the dashed lines 106 as it is picked up by the suction action of the vacuum induced in the inlet section 24. Thereafter it is free to be turned into the shredder head-on, as shown by the dashed lines 108, without jamming up in the transformation section 26. By the same token, the inclined sides 38 and 40 will tend to straighten out a branch lying on the ground, in the position shown by the dashed lines 110, to the position, within the inlet, as shown by the dashed lines 112.

The outlet section 28 may also be provided with an inspection door 114 for visual inspection of the condition of the respective blades in the power package. Due to the configuration and size of the inlet section 24 and the transformation section 26 and the novel guiding effect obtained thereby, these sections do not require cleanout or access doors for use in removing accumulated or jammed up debris. Referring to the before cited prior art references of Barnes, Ronning and Shaw it should be obvious that none of these references teach the unusual combination of sections as taught by the subject invention. For example, the Barnes machine will be satisfactory for leaves but would not be able to handle the larger sizes of twigs or branches due to the configuration of the suction tube 13 and the suction nozzle 15 and the absence of the pre-shredder feature as taught by the subject invention.

In a similar manner, the machines of Ronning and Shaw would not be able to handle the larger sizes of twigs and branches without extensive structural modifications and the addition of more shredder stages as is taught by the applicant's disclosure.

In summary, there has been provided by the subject invention a new and improved article shredding machine that accomplishes all of the objects and advantages of the invention by the new and novel means herein disclosed. Nevertheless it is apparent that many changes may be made in the arrangement of the parts and in the various types of parts themselves without departing from the spirit and scope of the invention and the invention is not to be limited to the preferred embodiment shown which has been given by way of illustration only.

Having described the invention, I claim:

1. A combination leaf and twig shredding machine comprising:
    a. a frame;
    b. means, mounted on said frame, for aligning and guiding the leaves and twigs to be shredded through the shredding machine, said guiding means comprising an inlet and an outlet and having formed therebetween a generally closed surface;
    c. shaft means extending through said guiding means;
    d. means, associated with said shaft means, for rotating said shaft means;
    e. means, rotatably mounted on said shaft means and positioned within said guiding means, for inducing a vacuum at said inlet of said guiding means, said vacuum causing the leaves and twigs to be drawn into and through said guide means;
    f. a pre-shredder mounted on the shaft in trailing relation to said vacuum inducing means and serving to pre-shred the twigs to be shredded in the machine;
    g. means, mounted in line and behind said pre-shredding means and within said guiding means, for finely shredding the leaves and twigs to a predetermined size, said shredding means comprising at least one fixed blade and at least one blade rotating in juxtaposition to said fixed blade; and
    h. means, rotatably mounted in line and behind said shredding means, for blowing the finely shredded leaves and twigs out of the outlet and away from said guiding means.

2. The article shredding machine as defined in claim 1 wherein the cross-sectional area of the inlet and outlet of said aligning and guiding means is substantially constant.

3. The shredding machine as defined in claim 1 wherein said means for inducing a vacuum and said pre-shredder comprises in part at least two rotary mounted pitched blades, positioned one behind the other and in such a manner that the first blade serves to induce the vacuum while the second blade serves to pre-shred the twigs passing through the rotating blades.

4. The shredding machine as defined in claim 1 wherein said shredding means comprises a pair of primary and a pair of secondary shredder blades.

5. The article shredder as defined in claim 4 wherein said primary pair of shredder blades comprise at least six blades, hub mounted on a rotating shaft, and said pair of secondary shredder blades comprise at least eight blades, hub mounted on a rotating shaft.

6. The shredder as defined in claim 5 wherein said means for blowing the shredded objects out of the outlet comprises at least 4 blades hub mounted on said shaft means.

7. The shredder as defined in claim 1 further comprising (i) a safety ring, being formed around the shredding means for containing any accidentally discharged blade or part of a blade, within the machine.

* * * * *